United States Patent Office 3,093,614
Patented June 11, 1963

3,093,614
CURED POLYMER COMPOSITIONS
James C. Mackenzie, Wellesley Hills, and Donald B. Smith, Danvers, Mass., assignors to Cabot Corporation, Boston, Mass., a corporation of Delaware
No Drawing. Filed Nov. 10, 1959, Ser. No. 851,954
9 Claims. (Cl. 260—41)

This invention relates to polymeric compositions and in particular to curable polymeric compositions having improved properties.

Essentially saturated long chain high molecular weight organic polymers, notably those formed by the polymerization of α-mono-olefinic hydrocarbons such as ethylene and propylene, have of late achieved considerable commercial importance. These polymeric materials are currently being extensively used as insulation for wire and cable, in conduits, in containers, etc. The fabrication, molding, extrusion, and calendering of these materials is readily accomplished by standard methods. Despite all this, however, the applications of these polymers are circumscribed by their lack of high temperature form stability, that is, their inability to retain a particular shape at elevated temperatures, by their solubility in certain solvents, and by their relatively poor resistance to environmental stress cracking.

In accordance with the present invention, it was discovered that the physical properties of such polymers can be greatly improved by the addition thereto of a minor amount, that is above about 0.1% by weight and preferably above about 0.5% by weight of the polymer, of p-dinitrosobenzene, poly(p-dinitrosobenzene), or m-dinitrosobenzene or mixtures thereof and curing at a temperature above the decomposition temperature thereof which is about 200° C., but may be lower in the presence of a decomposition catalyst such as a zinc salt. The hydrocarbon insolubility of the polymers is thereby greatly improved and the polymers have greatly increased resistance to creep and to stress cracking. When a filler such as carbon black is included, the tensile strength, yield strength, and temperature resistance of the polymers are also greatly increased.

Accordingly, it is a principal object of this invention to produce improved polymeric compositions.

Another object of this invention is to provide novel heat curable polymeric compositions.

Another object of this invention is to provide a novel curing agent for use in the curing of polymer compositions.

Other objects of the invention will in part be obvious and will in part appear hereinafter.

The polymers included within the scope of the present invention are the polymers and copolymers of the same or diverse α-mono-olefinic hydrocarbons, and mixtures thereof such as ethylene, propylene, butene and styrene.

In the interests of brevity and clarity only poly(p-dinitrosobenzene) is initially mentioned and discussed in the specification. Clearly, however, p-dinitrosobenzene and m-dinitrosobenzene are also suitable for the purposes of the present invention. Accordingly, it is desired that it be clearly understood that p-dinitrosobenzene, m-dinitrosobenzene, poly(p-dinitrosobenzene) and mixtures thereof are all included within the scope of the present invention and the initial mention of only poly(p-dinitrosobenzene) is not intended to limit the present invention in any way.

There seems to be no critical upper limit as to the amount of the curing agents of the present invention that can be utilized, but about 10% by weight of the total composition would seem to be a practical upper limit because of economic considerations.

From the unexpected results achieved by the practice of this invention, we postulate that the curing agents of the present invention, for example poly(p-dinitrosobenzene), decompose at temperatures above about 200° C. to produce free radicals which cause cross-linking between the polymer chains to occur, thereby improving substantially the physical properties of the polymer.

Hereinafter, follow a number of non-limiting illustrative examples. The degree of insolubility of the cured compounds in the following examples was the percentage of the polymer which remained undissolved after being extracted in diethylbenzene at 110° C. for twice the period of time necessary to completely dissolve the unmodified polymer. The degree of insolubility is accordingly regarded as being a substantially accurate measure of the extent to which cross-linking has taken place. It should be pointed out that the above described diethylbenzene test is a considerably more stringent test than many tests commonly utilized, such as the benzene test wherein the cured compound is extracted in benzene at 25° C. for about 24 hours. Accordingly, the percentage of insolubility indicated by the diethylbenzene test is substantially lower for a given compound than would be indicated by many of the commonly utilized milder solubility tests, hence the diethylbenzene test is believed to be more precise and reliable than such other tests.

Example 1

A composition comprising 100 parts by weight "Alathon 10," a polyethylene polymer produced by E. I. du Pont de Nemours and Co. and having a density of 0.92 and yield and tensile strengths at room temperature of about 1700 lb./in.$^2$ and 1750 lb./in.$^2$ respectively, and 5 parts "Polyac," a compound produced by E. I. du Pont de Nemours and Co. which comprises 25% by weight poly(p-dinitrosobenzene) and 75% inert filler, was cured for 10 minutes at 250° C. The resulting cured composition was found to be 77.9% insoluble. The same composition when cured under the same conditions for 10 minutes at 200° C. was found to be 100% soluble.

Example 2

A composition comprising 100 parts by weight "Alathon 10," 100 parts medium thermal carbon black, and 5 parts "Polyac" was cured for 10 minutes at 250° C. The resulting cured composition was found to be 70% insoluble on the polymer basis.

Example 3

A composition comprising 100 parts by weight "Alathon 10," 100 parts of a medium thermal carbon black and 1.20 parts of m-dinitrosobenzene is cured for 10 minutes at 250° C. The resulting composition is found to be 68% insoluble on the polymer basis.

As stated above the curing agents of the present invention, such as poly(p-dinitrosobenzene) effect curing at temperatures above about 200° C. These curing temperatures are often times, however, considerably higher than are most desirable for the processing of the aforesaid polymer compositions. Such higher temperatures are somewhat more difficult to attain, in any case are more costly, and are more apt to result in degradation of some polymers.

In accordance with the present invention, it was also discovered that the curing temperature of the aforesaid polymer compositions can be reduced below 200° C. and to as low as about 145° C. if there is added thereto a minor amount i.e. at least about 0.1% by weight of the polymer of a zinc salt, such as zinc stearate, zinc chloride and zinc acetate. There seems to be no critical upper limit as to the amounts of zinc salt that can be present although amounts larger than about 25% by weight of the total composition will seldom be used because the characteristics of the polymer at higher loadings become increasingly affected. For optimum results, however, it is preferred that from 0.5 to 2 parts of zinc salt per part of p-dinitrosobenzene or m-dinitrosobenzene be utilized.

*Example 4*

A composition comprising 100 parts by weight "Alathon 10," 2 parts zinc stearate and 5 parts "Polyac" was cured for 10 minutes at 180° C. The resulting cured composition was found to be 78% insoluble.

*Example 5*

A composition comprising 100 parts by weight "Alathon 10," 4 parts zinc stearate and 5 parts "Polyac" was cured for 10 minutes at 180° C. The resulting cured composition was found to be 83.4% insoluble.

*Example 6*

A composition comprising 100 parts by weight "Alathon 10," 1 part zinc chloride and 5 parts "Polyac" was cured for 10 minutes at 183° C. The resulting cured composition was found to be 60% insoluble. The same composition when cured under the same conditions for 10 minutes at 150° C. was found to be 57.2% insoluble.

*Example 7*

A composition comprising 100 parts by weight "Alathon 10," 100 parts of medium thermal carbon black, 2 parts zinc stearate and 5 parts "Polyac" was cured in a press for 15 minutes at 182° C. The resulting cured composition was found to be 47.3% insoluble on the polymer basis.

*Example 8*

A composition comprising 100 parts by weight "Alathon 10," 100 parts of medium thermal carbon black, 4 parts zinc stearate, and 5 parts "Polyac" was cured for 10 minutes at 145° C. The resulting composition was found to be 100% soluble on the polymer basis.

*Example 9*

A composition comprising 100 parts by weight "Alathon 10," 100 parts "Vulcan 9," an oil furnace carbon black having an average particle diameter of about 20 millimicrons, 2 parts zinc propionate and 5 parts "Polyac" was cured for 10 minutes at 180° C. The resulting cured composition was found to be 37.1% insoluble on the polymer basis.

*Example 10*

A composition comprising 100 parts by weight "Alathon 10," 0.27 part zinc oxide, 1.8 parts of stearic acid and 1.25 parts p-dinitrosobenzene was cured for 10 minutes at 180° C. The resulting cured composition was found to be 23.4% insoluble on the polymer basis. The same composition lacking only the stearic acid was cured under the same conditions. The resulting composition was found to be 100% soluble on the polymer basis.

*Example 11*

A composition comprising 100 parts by weight "Super Dylan 6200," a high density polyethylene polymer produced by Koppers Company Inc. having a density of 0.96, 100 parts medium thermal carbon black, 2 parts zinc stearate and 5 parts "Polyac" was cured in a press for 15 minutes at 182° C. The resulting cured composition was found to be 36% insoluble on the polymer basis.

From the unexpected results achieved, we postulate that zinc salts cause the curing agents of the present invention to decompose at temperatures lower (minimum being above about 145° C.) than that at which they normally decompose (minimum being above about 200° C.), thereby initiating cross-linking between the polymer chains at temperatures lower than would normally be possible when utilizing poly(p-dinitrosobenzene), p-dinitrosobenzene, m-dinitrosobenzene or mixtures thereof as the sole curing agents.

As previously mentioned, the yield strength, the tensile strength, and the temperature resistence of the above discussed polymers are greatly increased when a filler or pigment is utilized. The preferred filler is carbon black but other fillers such as finely-divided metal and metalloid oxides, metal silicates, wood flour, and many others are also suitable for the purposes of the instant invention.

It should be pointed out that the process of the present invention is particularly suitable for use in the strengthening of the high-melting polymers, for example, of ethylene, and propylene, which have recently been developed. Cross-linking agents suitable for the strengthening of low melting polymers have been known for some time. However, the new high melting polymers require milling at considerably higher temperatures than is necessary for the low-melting polymers. Accordingly, most of the curing agents that were known heretofore, such as the α-aralkyl peroxides, which decompose at temperatures sufficiently high to allow their being milled into the low-melting polymers without effecting premature and therefore non-uniform curing are generally not suitable for use as curing agents for the high melting polymers because they decompose at temperatures that are too low. The process of the present invention, however, allows curing to be effected only at temperatures above about 145° C. Accordingly, the process of the present invention is completely suitable for use in the curing of high-melting polymers.

The present invention has in at least one very important aspect, definite advantage over prior art curing processes as regards the curing of low melting polymer compositions also. When low melting polymer compositions are processed in conventional extruding apparatus, for example, in the production of cured polyethylene tubing, the rate of extrusion of the tubing is very highly dependent upon the viscosity of the molten composition being extruded. Accordingly, heretofore, extrusion rates were distinctly limited because, due to the relatively low curing temperatures of the prior art curing processes, the temperature of the molten composition could not be increased (and the viscosity accordingly lowered) without causing premature decomposition of the curing agent and concomitant curing of the composition in the extruder. The present invention, however, completely overcomes this severe limitation because the curing process of the present invention operates at substantially higher temperatures (i.e., above about 145° C.). Accordingly, extrusion rates can be greatly increased.

Obviously many changes may be made in the above specifically disclosed formulations without departing from the scope of the invention. For example, in addition to those zinc salts expressly mentioned above as being suitable, many others such as zinc undecylate, zinc benzoate, and zinc propionate are also suitable.

In addition to polyethylene, polypropylene, and polybutene, other polymers and copolymers of mono-olefinic monomers and mixtures thereof, can also be utilized in the practice of this invention. Therefore, it is intended that the disclosure of specific materials herein be regarded as illustrative and as in no way limiting the scope of the invention.

What we claim is:

1. A process for strengthening a substantially saturated polymeric material chosen from the group consisting of the homopolymers of ethylene, propylene, and butene, copolymers thereof and mixtures thereof, to produce a material having exceptional flexibility and strength, which comprises compounding said material with an amount between about 0.1% and about 10% by weight of the polymer of a curing compound chosen from the group consisting of p-dinitrosobenzene, poly(p-dinitrosobenzene), m-dinitrobenzene and mixtures thereof, and an amount above about 0.1% by weight of said material of zinc salt, and curing the resulting compounds at a temperature above about 145° C.

2. The process of claim 1 wherein said substantially saturated polymeric material comprises polyethylene.

3. The process of claim 1 wherein said zinc salt is chosen from the group consisting of zinc stearate, zinc chloride, zinc propionate, zinc acetate and zinc benzoate.

4. The process of claim 3 wherein said substantially saturated polymeric material comprises polyethylene.

5. A process for producing polymeric compounds having exceptional flexibility and strength which comprises compounding with a substantially saturated polymeric material chosen from the group consisting of homopolymers of ethylene, propylene, and butene, copolymers thereof and mixtures thereof, a filler, and amount between about 0.1% and about 10% by weight of said material of a curing agent chosen from the group consisting of p-dinitrosobenzene, poly(p-dinitrobenzene), m-dinitrosobenzene and mixtures thereof, and an amount above about 0.1% by weight of said material of zinc salt, and curing the compound at a temperature above about 145° C.

6. The process of claim 5 wherein said zinc salt is chosen from the group consisting of zinc stearate, zinc chloride, zinc propionate, zinc acetate and zinc benzoate.

7. The process of claim 5 wherein said polymeric material comprises polyethylene.

8. The process of claim 5 wherein said polymeric material comprises polypropylene.

9. The process of claim 5 wherein said filler comprises carbon black.

References Cited in the file of this patent

UNITED STATES PATENTS

| | | |
|---|---|---|
| 2,393,321 | Haworth | Jan. 22, 1946 |
| 2,748,104 | Viohl | May 29, 1956 |
| 2,974,377 | Kunkle | Mar. 14, 1961 |
| 2,997,452 | Makowski et al. | Aug. 22, 1961 |

FOREIGN PATENTS

| | | |
|---|---|---|
| 610,129 | Great Britain | Oct. 12, 1948 |

UNITED STATES PATENT OFFICE
CERTIFICATE OF CORRECTION

Patent No. 3,093,614            June 11, 1963

James C. MacKenzie et al.

It is hereby certified that error appears in the above numbered patent requiring correction and that the said Letters Patent should read as corrected below.

In the grant, line 1, and in the heading to the printed specification, line 3, for "James C. Mackenzie" read -- James C. MacKenzie --; column 4, line 75, for "m-dinitrobenzene" read -- m-dinitrosobenzene --; column 5, line 19, for "poly(p-dinitrobenzene)" read -- poly(p-dinitrosobenzene) --.

Signed and sealed this 30th day of June 1964.

(SEAL)
Attest:

ERNEST W. SWIDER
Attesting Officer

EDWARD J. BRENNER
Commissioner of Patents